(12) United States Patent  
Hansen (10) Patent No.: US 7,797,508 B2  
(45) Date of Patent: Sep. 14, 2010

(54) FAIR MEMORY RESOURCE CONTROL FOR MAPPED MEMORY

(75) Inventor: David C. Hansen, Hillsboro, OR (US)

(73) Assignee: International Business Machines Corporation, Armonk, NY (US)

( * ) Notice: Subject to any disclaimer, the term of this patent is extended or adjusted under 35 U.S.C. 154(b) by 509 days.

(21) Appl. No.: 11/831,111

(22) Filed: Jul. 31, 2007

(65) Prior Publication Data

US 2009/0037685 A1 Feb. 5, 2009

(51) Int. Cl.
*G06F 12/00* (2006.01)
(52) U.S. Cl. ...................................... 711/206
(58) Field of Classification Search ........................ None
See application file for complete search history.

(56) References Cited

U.S. PATENT DOCUMENTS

| | | | |
|---|---|---|---|
| 6,112,286 A * | 8/2000 | Schimmel et al. | 711/208 |
| 6,148,379 A * | 11/2000 | Schimmel | 711/152 |
| 6,247,109 B1 | 6/2001 | Kleinsorge et al. | |
| 7,035,989 B1 | 4/2006 | Hinker et al. | |
| 2003/0110205 A1 | 6/2003 | Johnson | |
| 2005/0235123 A1 | 10/2005 | Zimmer et al. | |
| 2009/0037685 A1 * | 2/2009 | Hansen | 711/171 |

OTHER PUBLICATIONS

D. McCracken,"Object-based Reverse Mapping," Proceedings of the Linux Symposium vol. Two, 2004, 6 pages.

* cited by examiner

*Primary Examiner*—Brian R Peugh
(74) *Attorney, Agent, or Firm*—Walter W. Duft (57) ABSTRACT

A method, system and computer program product for managing memory allocation among plural virtual application environments supported by a common operating system. The technique may include establishing a mapping between a virtual application environment (or processes therein) and a mapping proxy that is reachable via a reverse mapping pathway adapted to facilitate identification of virtual addresses associated with a memory page frame. The virtual application environment (or processes therein) may be identified as an allocation recipient of the memory page frame by traversing the reversing mapping pathway to the mapping proxy. The memory page frame may be reclaimed for allocation to another virtual application environment by invalidating data therein or transferring the data to a storage resource based upon memory usage by the identified virtual application environment.

20 Claims, 8 Drawing Sheets

FAIR MEMORY RESOURCE CONTROL FOR MAPPED MEMORY

BACKGROUND OF THE INVENTION

1. Field of the Invention

The present invention is directed to the virtualization of data processing systems to provide multiple execution environments. More particularly, the invention concerns the allocation of mapped memory to and among virtual execution environments.

2. Description of the Prior Art

By way of background virtualization is a technique whereby the resources of a data processing system are divided into multiple execution environments. Virtualization comes in many flavors. One approach, known as operating system-level virtualization, is a virtualization technology that partitions the application space supported by a single operating system into multiple small virtual application environments. Each virtual application environment may be assigned a share of physical and logical resources managed by the underlying operating system. Such resource allocations may include CPU time, memory, I/O (Input/Output) ports, network devices, disk partitions, etc. Depending on the particular virtualization implementation being used, each virtual application environment may have its own process tree, file system directory tree, users and groups, system libraries, network addresses, disk space, etc.

One advantage of operating system-level virtualization is that the resources assigned to each virtual application environment can be selectively allocated in order to provide differentiated quality of service guarantees. However, this requires some level of resource control capability in the underlying operating system. The sharing of mapped memory among virtual application environments has heretofore been a problem when trying to manage resource allocations. This is due to the overhead associated with storing and maintaining memory accounting structures that map physical page frames to each virtual application environment. Such mappings are needed in order to track the amount of physical memory being used by the virtual application environments at any given time.

Figure 1:
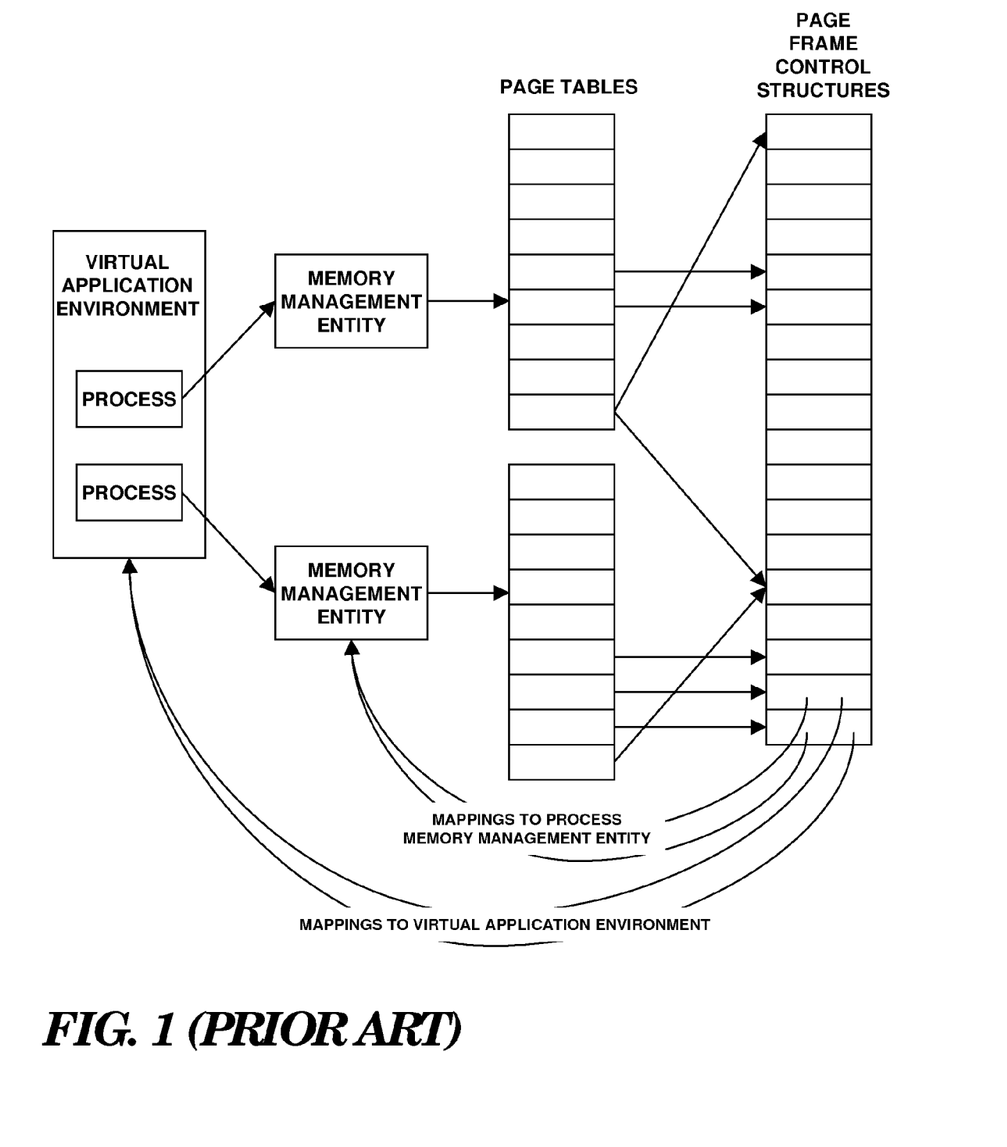
FIG. 1 is a functional block diagram showing a prior art memory mapping system for allocating mapped memory to a virtual application environment using pointers from page frame control structures.

The conventional approach is to either statically assign ownership of a single memory page to a single virtual application environment or to keep a list of virtual application environments and associate the list with the page. This is typically done by appending ownership information to page frame control structures (also known as page descriptors) that are used to keep track of the page frames. For example, as shown in FIG. 1, each page frame used by processes associated with a particular virtual application environment has a field in its page frame control structure that holds a pointer which maps to the virtual application environment. This approach tends to have a cost of about one word per page of memory in the system. For a 64 GB system with 4 KB memory page frames, there are approximately 16 million page frames each having its own page frame control structure. Even without the virtual application environment mapping information, the amount of memory required to store this many page frame control structures can easily represent 1% of the system memory (depending on page frame control structure size), which is 640 MB of memory in a 64 GB system. Increasing the size of each page frame control structure to support mapping to virtual application environments requires additional memory. In the above example where there are 16 million page frame control structures, the additional memory utilization may add many megabytes of memory that would be otherwise available for use by application processes.

As additionally shown in FIG. 1, it is also conventional in some operating systems (such as Linux® kernel version 2.6) to map page frames to memory management entities that are associated with processes. These memory management entities are known as memory descriptors and they define the virtual address space of their associated process. The mapping of page frames to such entities is known as reverse mapping. It is used by pageout algorithms to determine the virtual addresses associated with page frames that are being reallocated, swapped out or otherwise manipulated, and to efficiently locate and invalidate the page table entries containing the virtual address/page frame translations for such page frames.

There is presently a need for an improved technique for controlling memory allocation among virtual application environments in an operating system-level virtualization system. What is required is a solution that allows memory allocations to virtual application environments to be modified in response to changes in physical memory availability, with minimal overhead being required to track the memory assignments to the various virtual application environments. Applicant submits that a solution which takes advantage of existing page frame reclamation reverse mapping capabilities would be of particular interest.

SUMMARY OF THE INVENTION

The foregoing problems are solved and an advance in the art is obtained by a method, system and computer program product for managing memory allocation among plural virtual application environments supported by a common operating system. The technique may include establishing a mapping between a virtual application environment (or processes therein) and a mapping proxy that is reachable via a reverse mapping pathway adapted to facilitate identification of virtual addresses associated with a memory page frame. The virtual application environment (or processes therein) may be identified as an allocation recipient of the memory page frame by traversing the reverse mapping pathway to the mapping proxy. The memory page frame may be reclaimed for allocation to another virtual application environment by invalidating data therein or transferring the data to a storage resource based upon memory usage by the identified virtual application environment.

According to exemplary disclosed embodiments, the mapping proxy may comprise a memory management entity that contains information for a process address space. The mapping proxy may include a single mapping to the virtual application environment, such as a link between the mapping proxy and a resource accounting entity associated with the virtual application environment. The mapping proxy may also include plural mappings to individual processes in the virtual application environment. Reclamation of the memory page frame may be conditioned upon any desired criteria, such as the identified virtual application environment exceeding a memory resource limit or being allocated less than a memory resource minimum guarantee.

BRIEF DESCRIPTION OF THE DRAWINGS

The foregoing and other features and advantages of the invention will be apparent from the following more particular description of exemplary embodiments, as illustrated in the accompanying Drawings, in which.

DETAILED DESCRIPTION OF EXEMPLARY EMBODIMENTS

Figure 2:
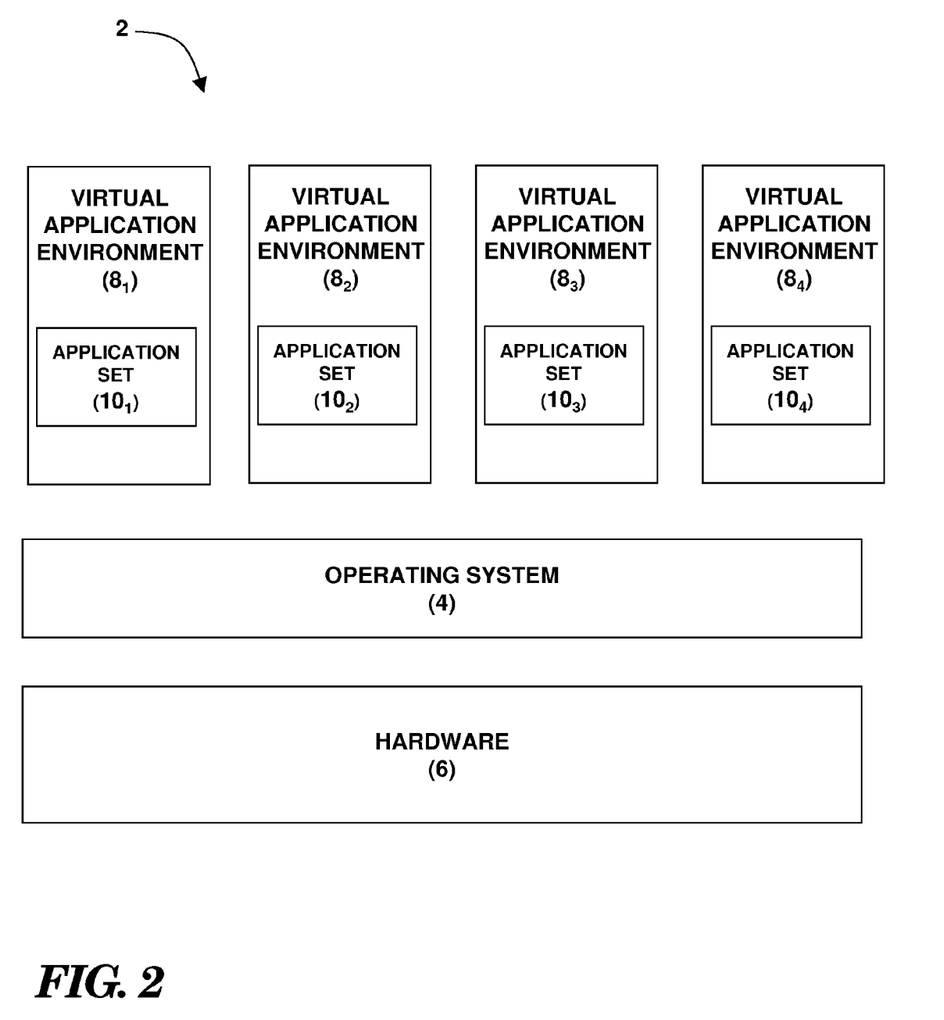
FIG. 2 is a functional block diagram showing an exemplary data processing system in which an operating system supports plural virtual application environments to provide operating system-level virtualization.

Turning now to remaining drawing figures, wherein like reference numerals indicate like elements in all of the several views. FIG. 2 illustrates an exemplary data processing system 2 in which an operating system 4 running on a hardware platform 6 supports plural virtual application environments $8_1$, $8_2$, $8_3$ and $8_4$. The virtual application environments $8_1$, $8_2$, $8_3$ and $8_4$, in turn support respective application sets $10_1$, $10_2$, $10_3$ and $10_4$, that each comprise one or more processes, threads or other execution contexts. The hardware platform 6 can be implemented using any known data processing equipment that is capable of supporting execution of the operating system 4, including the exemplary data processing hardware described below in connection with FIG. 9. The operating system 4 can be implemented using any operating system software capable of supporting the virtual application environments $8_1$, $8_2$, $8_3$ and $8_4$ with appropriate modifications being made thereto according to the disclosure herein. Examples of operating systems having the required virtual application environment support capability include the IBM® AIX® 6 operating system with WPAR (Workload PARtition) support, IBM® Meiosys virtualization products, and Linux® operating system kernels built in accordance with the OpenVZ project, the VServer project, or the Free VPS project. These operating systems have the ability to map physical memory to virtual application environments. However, as described by way of background above, such memory mappings conventionally add pointer fields to the page frame control structures that point to individual virtual application environments or to lists of such environments. This type of mapping can consume large amounts of memory.

Figure 3:
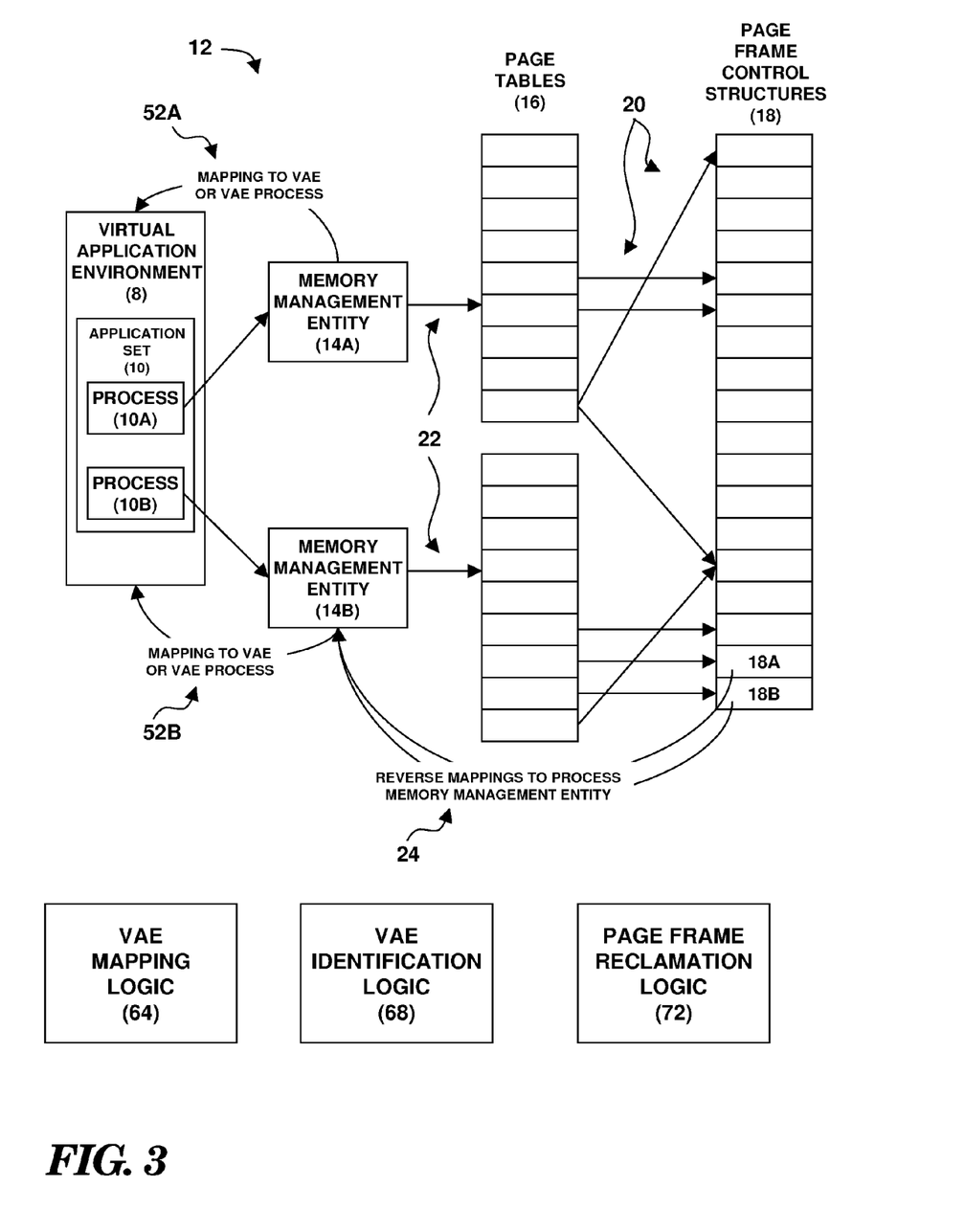
FIG. 3 is a functional block diagram showing an exemplary improved memory mapping system that may be implemented in accordance with the disclosure herein.

Turning now to FIG. 3, the operating system 4 of FIG. 2 can be modified to implement a memory mapping system 12 that provides an improved memory mapping technique for managing the virtual application environments $8_1$, $8_2$, $8_3$ and $8_4$ of FIG. 2. In FIG. 3, reference numeral 8 identifies a representative one of the FIG. 2 virtual application environments $8_1$, $8_2$, $8_3$ and $8_4$. Reference numeral 10 identifies a representative one of the application sets $10_1$, $10_2$, $10_3$ and $10_4$ of FIG. 2. Reference numerals 10A and 10B identify individual processes (applications) of the representative application set 10. Each process 10A and 10B is respectively associated (e.g., via a pointer in its task structure) with a memory management entity 14A and 14B. The memory management entities 14A and 14B respectively define the process address space for the processes 10A and 10B. In this sense, the memory management entities 14A and 14B are conventional and may be implemented, by way of example only, using data structures such as those found in Linux® kernel version 2.6 whose C code designation is "struct mm_struct." However, as described in more detail below, the memory management entities 14A and 14B may be modified to support improved memory mapping in accordance with the present disclosure.

FIG. 3 also illustrates a set of page tables 16 and a set of page frame control structures 18. The page tables 16 comprise page table entries that map virtual memory addresses within the process address space of the processes 10A and 10B to memory page frames (not shown) that are represented by the page frame control structures 18. Reference numeral 20 identifies exemplary mappings between selected page table entries and page frame control structures. Reference numeral 22 illustrates exemplary mappings between the memory management entities 14A and 14B and the page tables 16. For example, such mappings could be pointers to a page global directory (not shown), which represents the root of a tree of page tables through which the page tables 16 can be located.

In the memory mapping system 12, the accounting overhead heretofore required to map a page frame control structure to a virtual application environment is significantly reduced. Instead of maintaining virtual application environment mapping information in the page frame control structures 18, this information is eliminated and a conventional reverse mapping mechanism may be used in combination with a novel virtual application environment mapping proxy to map page frames to virtual application environments. As described by way of background above, reverse mapping is a technique that can be used by an operating system memory management unit to map physical page frames to page table entries containing virtual memory/page frame translations. Reverse mapping allows the memory management unit to locate all page table entries that point to a page frame and which need to be invalidated when the page frame is reallocated, swapped out or otherwise manipulated. Without the reverse mapping mechanism, the memory management unit must perform the time consuming task of walking the page tables to identify all page table entries that reference the page frame being manipulated. In FIG. 3, reference numeral 24 identifies exemplary reverse mappings from two page frame control structures 18A and 18B to the memory management entity 14B.

The Linux® 2.6 kernel exemplifies one operating system that makes use of reverse mapping. In this kernel version, two reverse mapping pathways are used, one for filed-mapped memory and the other for anonymous memory. These reverse mapping pathways will now be summarized in order to acquaint the reader with exemplary techniques that have been used to implement reverse mapping. Although these prior art techniques represent one possible way that reverse mapping could be implemented in the memory mapping system 12, it should be understood that they are by no means the only possibilities and that other reverse mapping schemes may used. It will also be helpful to bear in mind that reverse mapping is only used as a building block to provide a partial mapping between page frame control structures and virtual application environments. As described in more detail below, a novel virtual application environment mapping proxy is also utilized to complete the mapping chain from page frame control structure to virtual application environment.

Figure 4:
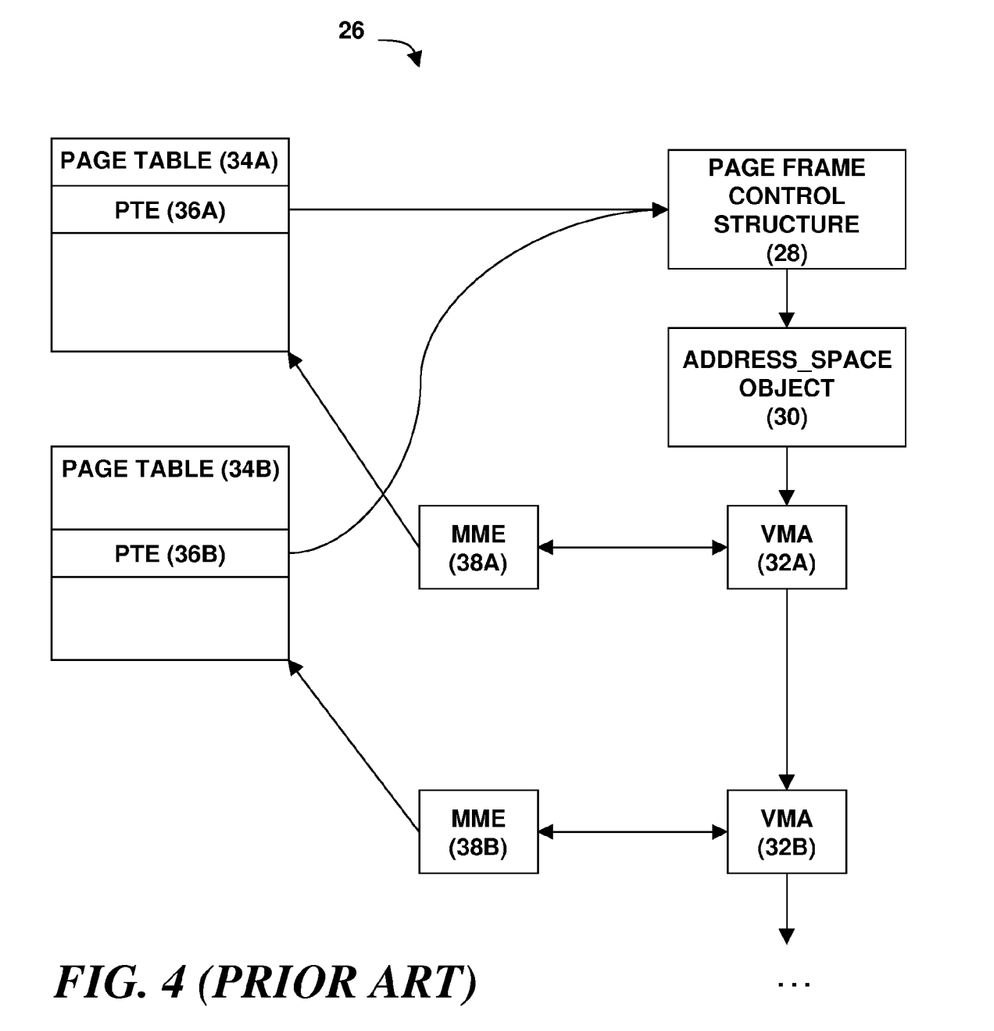
FIG. 4 is a functional block diagram showing an exemplary prior art reverse mapping mechanism for file-mapped memory.

FIG. 4 shows a conventional reverse mapping pathway 26 that has heretofore been used for filed-mapped memory. In FIG. 4, an exemplary page frame control structure corresponding to a physical page frame is shown by reference numeral 28. In Linux® kernel version 2.6, the page frame control structure 28 is a data structure whose C code designation is "struct page." It contains fields that identify the file to which the associated page frame is mapped and the base offset within the file where the page frame begins. The file identifier comprises an object pointer to an address space object 30 that in Linux® kernel version 2.6 is a data structure whose C code designation is "struct address_space." The address space object 30 is a base anchor for all memory associated with the file. It identifies the inode for the file, defines operations for managing the page frames belonging to the file, and maintains pointers to linked lists of virtual memory area objects that in Linux® kernel version 2.6 are data structures whose C code designation is "struct vm_area_struct." In FIG. 4, two such virtual memory area objects (VMA) 32A and 32B are shown. The virtual memory area objects 32A and 32B each represent an area of virtual memory that is assigned to a process and whose size is some multiple of the page frame size. Each virtual memory area object 32A and 32B is associated with a process having a mapping into the file represented by the address space object 30. Each describes how the file mapping appears in a given process' address space. In particular, the virtual memory area objects 32A and 32B contain the virtual address of the mapping and the base offset within the file. The virtual memory area objects 32A and 32B also map (via a pointer) to the memory management entities for their associated processes. In FIG. 4, the virtual memory area object 32A and 32B respectively map to the memory management entities 38A and 38B. As described above, in Linux® kernel version 2.6 the memory management entities 38A and 38A are data structures whose C code designation is "struct mm_struct."

To perform a reverse mapping operation using the memory management infrastructure of FIG. 4, the page frame control structure 28 is read to identify the file offset for the associated page frame and the address space pointer is followed to the address space object 30. A walk of the linked list of virtual memory area objects is performed and the virtual memory area objects 32A and 32B are evaluated to determine if their file offset value corresponds to the file offset value identified in the page frame control structure 28. If it does, a simple calculation determines the virtual address for the page frame and the pointer to the associated memory management entity 38A or 38B is followed. The memory management entity 38A or 38B is then consulted and its pointer to the page global directory (not shown) is used to enter the page table tree, locate one of the page tables 34A or 34B, and then find the page table entry 36A or 36B that corresponds to the virtual address determined from the virtual memory area object 32A or 32B. The identified page table entry may then be invalidated as part of the page frame reclamation operation.

Figure 5:
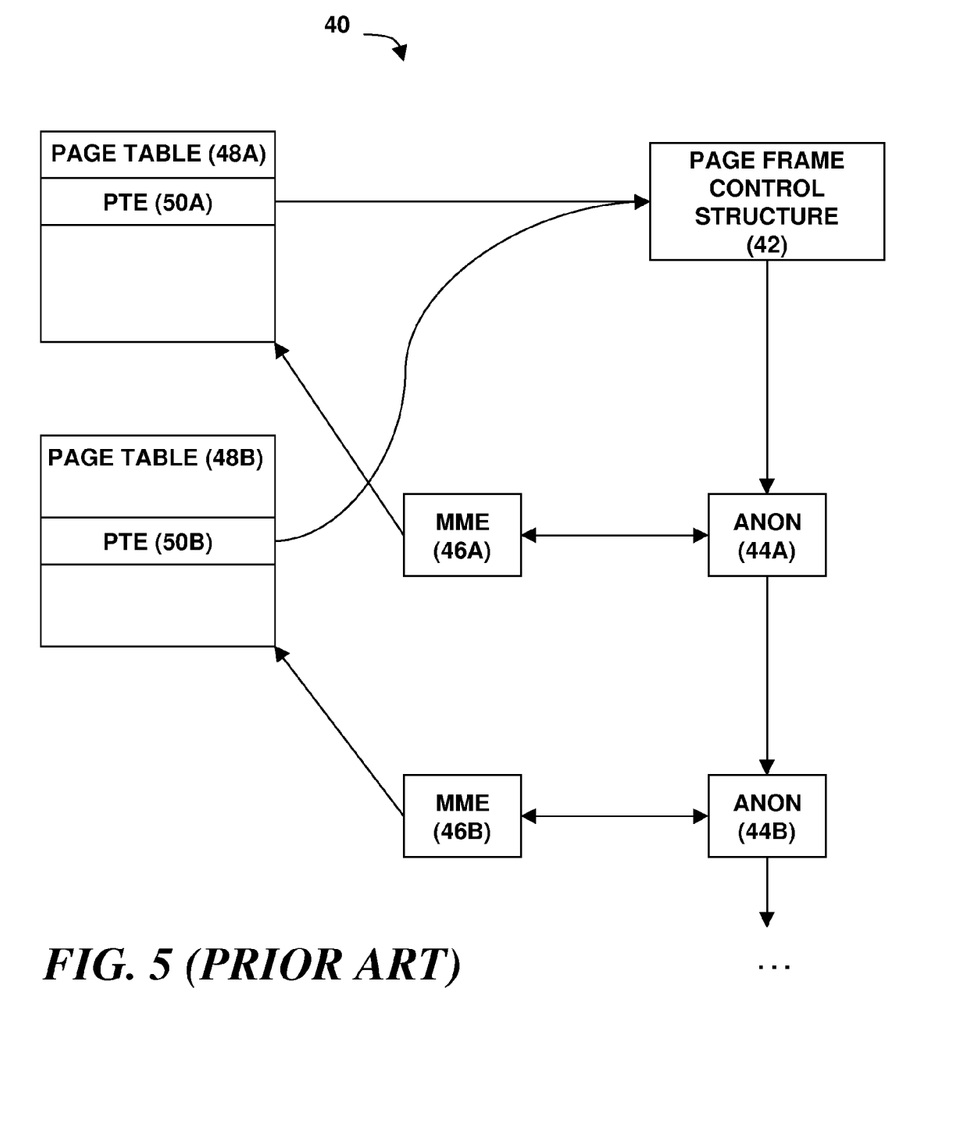
FIG. 5 is a functional block diagram showing an exemplary prior art reverse mapping mechanism for anonymous memory.

Turning now to FIG. 5, a conventional reverse mapping pathway 40 is shown that has heretofore been used for anonymous memory. In FIG. 5, an exemplary page frame control structure corresponding to a physical page frame is shown by reference numeral 42. Anonymous pages have the same virtual address in every process. The offset field normally used to index the file offset for file-mapped memory (see description of FIG. 4) is used to hold the virtual address for all anonymous pages that map to the page frame. An object pointer in the page frame control structure 42 points to a linked list of anonymous virtual memory area objects that in Linux® kernel version 2.6 are data structures whose C code designation is "struct anonmm." In FIG. 5, two such anonymous virtual memory area objects (ANON) 44A and 44B are shown. Each anonymous virtual memory area object 44A and 44B is associated with a process that uses virtual addresses that are not backed by a named file. The anonymous virtual memory area objects 44A and 44B map (via a pointer) to the memory management entities for their associated processes and provide a way to search the memory management entities during reverse mapping. In FIG. 5, the virtual memory area object 44A and 44B respectively map to the memory management entities 46A and 46B. As described above, in Linux® kernel version 2.6 the memory management entities 46A and 46A are data structures whose C code designation is "struct mm_struct."

To perform a reverse mapping operation using the memory management infrastructure of FIG. 5, the page frame control structure 42 offset field is read to identify the virtual address for the anonymous page(s) associated with the page frame, and the object pointer is followed to the linked list of anonymous virtual memory area objects 44A and 44B. A walk of the linked list is performed and the anonymous virtual memory area objects 44A and 44B and their associated memory management entities 46A and 46B are evaluated Each memory management entity 46A or 46B has a pointer to the page global directory (not shown) that can be is used to enter the page table tree, locate one of the page tables 48A or 48B, and then find the page table entry 50A or 50B that corresponds to the virtual address determined from the page frame control structure 42. The identified page table entry may then be invalidated as part of the page frame reclamation operation.

Returning now to FIG. 3, when it is desired to reclaim physical memory from the virtual application environment 8 (e.g., so that it can be reallocated to another virtual application environment), the existing reverse mapping pathways from the page frame control structures 18 (such as the reverse mapping pathways 24) can be used to reach the memory management entities (14A and 14B). It is then necessary to locate the virtual application environment 8 from the memory management entities insofar as the prior art memory intensive practice of providing direct mappings to virtual application environments in each page frame control structure is eliminated in the memory mapping system 12 in order to reduce memory overhead. Advantageously, locating the virtual application environment 8 can be handled by modifying the memory management entities 14A and 14B to act as mapping proxies that provide additional mappings to the virtual application environment 8, or to the processes 10A and 10B therein. These additional mappings are shown by reference numerals 52A and 52B in FIG. 3. The mapping 52A maps the memory management entity 14A and the mapping 52B maps the memory management entity 14B.

Thus, as stated above, the memory management system 12 implements a combination of (1) removing direct mappings from the page frame control structures 18 to the virtual application environment 8, thereby reducing control structure size and the associated memory overhead, and (2) piggybacking on the existing reverse mappings from the page frame control structures 18 to the memory management entities 14A and 14B by creating additional mappings 52A and 52B from the memory management entities to the virtual application environment 8. Inserting the new mappings 52A and 52B in the memory management entities 14A and 14B uses much less memory than the existing technique of carrying both direct mappings to the virtual application environment 8 and reverse mappings to the memory management entities 14A and 14B in the page frame control structures 18, as is shown in FIG. 1. This is because there can be several millions of page frame control structures 18 whereas the number of memory management entities matches the number of processes, which is usually much less than the number of page frames.

Figure 6:
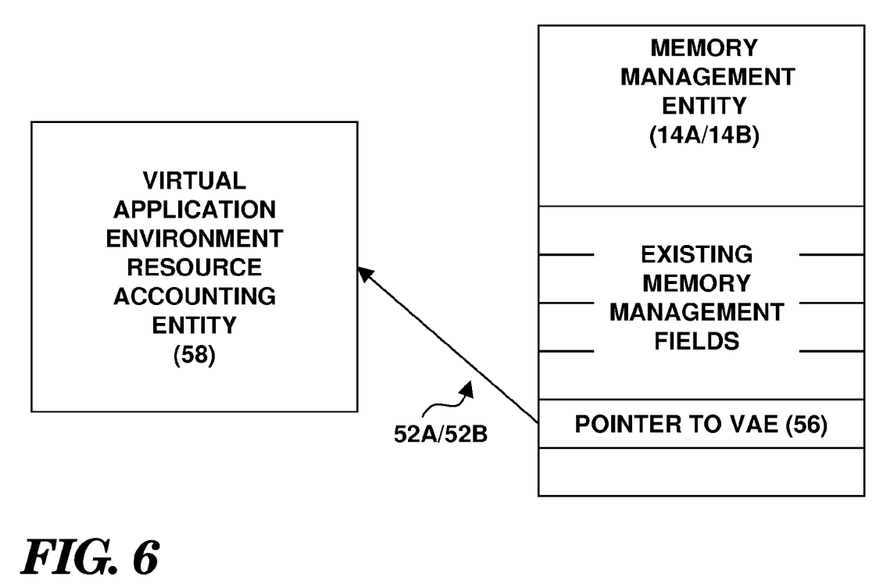
FIG. 6 is a functional block diagram showing an exemplary mapping between a memory management entity and a virtual application environment.
Figure 7:
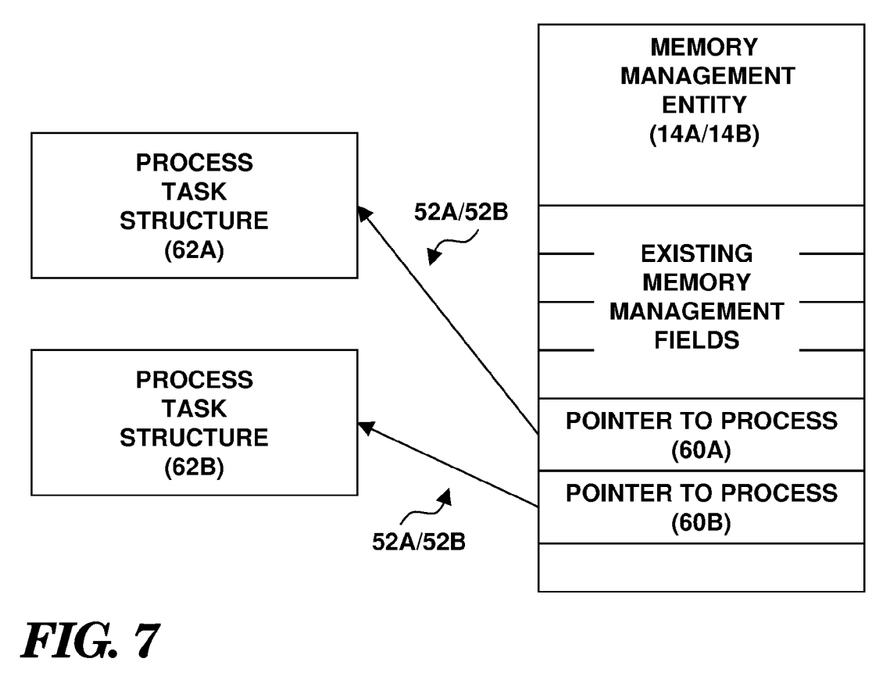
FIG. 7 is a functional block diagram showing exemplary mappings between a memory management entity and processes in a virtual application environment.

FIGS. 6 and 7 illustrate examples of how the mappings 52A and 52B can be implemented. In FIG. 6, the mappings 52A and 52B may be provided by a pointer 56 in each of the memory management entities 14A and 14B that points to a virtual application environment resource accounting entity (58). This entity contains information about current resource utilization levels of the virtual application environment 8 and may also include information about resource limits and/or resource guarantees. One of the resources that may be tracked by the virtual application environment resource accounting entity 58 is memory. In FIG. 7, the mappings 52A and 52B may be provided by pointers 60A and 60B in each of the memory management entities 14A and 14B that respectively point to the task structures 62A and 62B of the processes 10A and 10B of FIG. 3.

Figure 8:
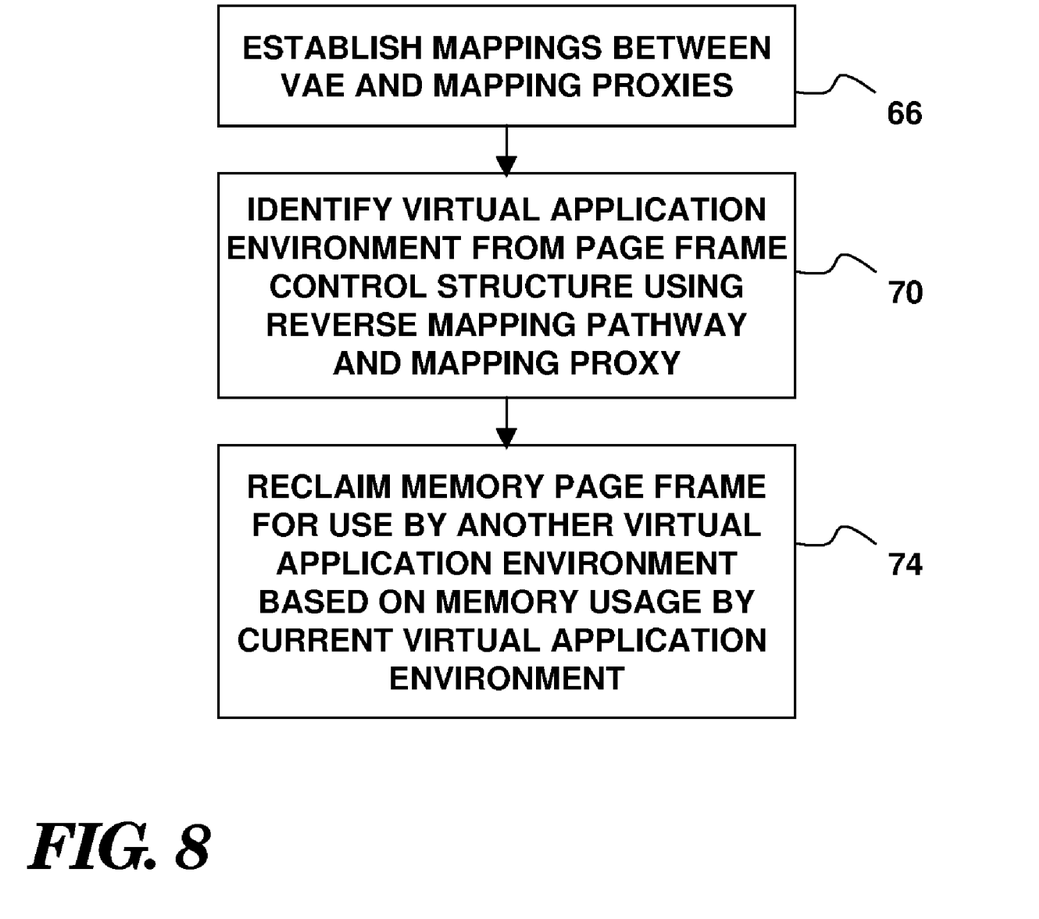
FIG. 8 is a flow diagram showing exemplary memory mapping and reclamation processing.

As shown in FIG. 3, virtual application mapping logic 64 within the operating system 4 of FIG. 2 may be used to establish the respective mappings 52A and 52B between the virtual application environment 8 and the mapping proxies provided by memory management entities 14A and 14B. Step 66 in the flow diagram of FIG. 8 illustrates this operation. When it is desired to manipulate a page frame associated with one of the page frame control structures 18, virtual application environment identification logic 68 (FIG. 3) within the operating system 4 of FIG. 2 may be used to identify the virtual application environment that is an allocation recipient of the target page frame. For example, assume that a page frame associated with the page frame control structure 18A is being manipulated. As shown in step 70 of FIG. 8, the virtual application environment 8 can be identified by initially traversing the reverse mapping pathway 24 that extends from the page frame control structure 18A to the memory management entity 14B. The memory management entity 14B is then used as a mapping proxy for the virtual application environment 8 by traversing the mapping pathway 52B to the virtual application resource accounting entity 58 of FIG. 6, or to the process task structures 62A and 62B of FIG. 7, or to any other object associated with the virtual application environment 8 or the processes 10A and 10B. Page frame reclamation logic 72 (FIG. 3) within the operating system 4 of FIG. 2 may then be used to reclaim the memory page frame associated with the page frame control structure 18A. As shown in step 74 of FIG. 8, reclamation of the target page frame may entail invalidating the data therein or transferring the data to a storage resource (not shown) based upon memory usage by the virtual application environment 8 that was identified in step 70 of FIG. 8, and which is the current allocation recipient of the target page frame. By way of example only, reclamation may be conditioned upon the identified virtual application environment target exceeding a memory resource limit (e.g., as specified in the accounting entity 58), in which case the target page frame may be reclaimed. Alternatively, reclamation may be conditioned upon the identified virtual application environment target currently being allocated less than a memory resource minimum guarantee (e.g., as specified in the accounting entity 58), in which case the target page frame may not be reclaimed. Many other criteria could also be used according to applicable memory allocation polices.

As previously stated, the use of the memory management entities 14A and 14B as mapping proxies has the advantage of reducing the memory required for the page frame control structures 18 because per-control structure mappings to virtual application environments are eliminated. Instead, the existing reverse mapping pathways 24 are used to reach the memory management entities 14A and 14B, and the new mappings 52A and 52B are used to reach the virtual application environment 8. Although the size of the memory management entities 14A and 14B is increased to accommodate the mappings 52A and 52B, the additional memory utilization is substantially lower than the prior art mapping technique because there are typically far fewer memory management entities 14A and 14B than there are page frame control structures 18. In particular, whereas there would be approximately 16 million page frame control structures 18 in a 64 GB system with 4 KB page frames, the number of memory management entities 14A and 14B would correspond to the number of processes, which may be on the order of thousands but usually not tens of millions.

It should also be understood that the memory management entities 14A and 14B are not the only objects that may be used as mapping proxies for virtual application environments. In general, any set of objects whose number is smaller than the number of page frame control structures may be used as mapping proxies, provided these objects can be reached from the page frame control structures using less memory overhead than is required by prior art techniques.

Figure 9:
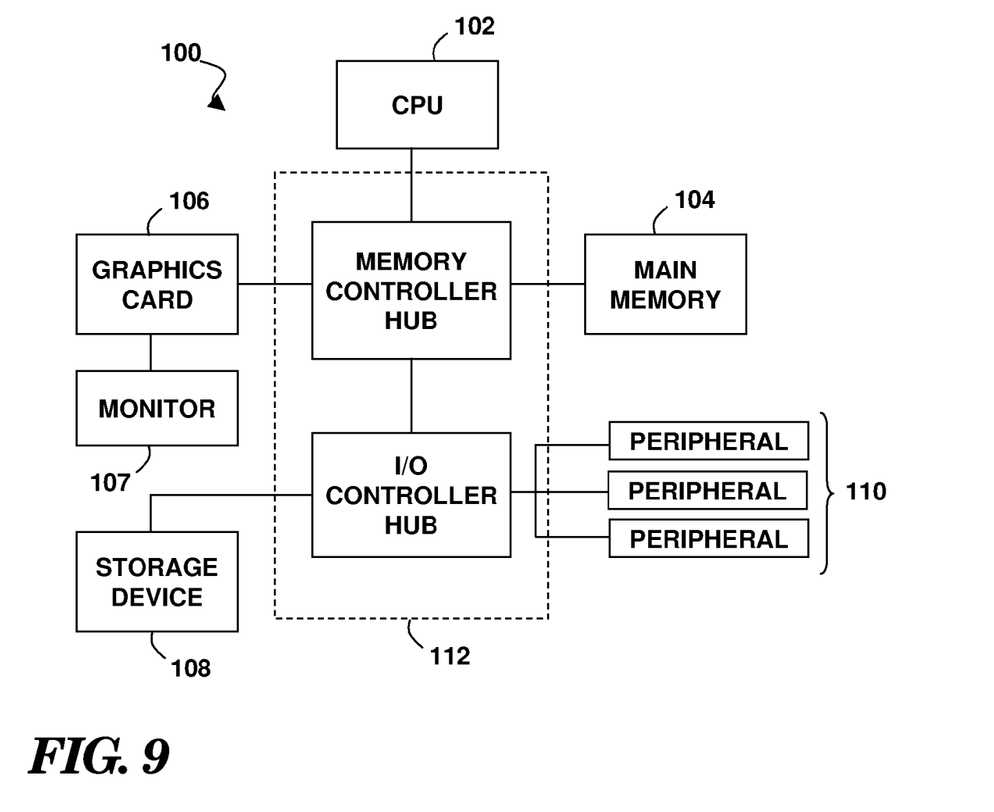
FIG. 9 is a functional block diagram showing exemplary data processing hardware that may be used to implement the data processing system of FIG. 2 and the memory mapping system of FIG. 3.

Accordingly, a technique has been disclosed for improving the efficiency of managing memory allocation among virtual application environments. It will be appreciated that the foregoing concepts may be variously embodied in any of a data processing system, a machine implemented method, and a computer program product in which programming logic is provided by one or more machine-useable media for use in controlling a data processing system to perform the required functions. Relative to a data processing system and machine implemented method. FIG. 9 illustrates an exemplary hardware environment 100 that may be used to implement the data processing system 2 of FIG. 2 and the memory mapping system 12 of FIG. 3. The hardware environment 100 includes one or more CPUs or other logic implementing hardware 102 and a main memory 104 that provide a processing core, an optional graphics card 106 for generating visual output information to an optional display monitor 107, a peripheral storage device 108, other peripheral devices 110, and a bus infrastructure 112 interconnecting the foregoing elements. The memory mapping system 12 of FIG. 3 may be loaded in the main memory 104. Various I/O (Input/Output) resources may be provided by the peripheral devices 110, which may include a USB bus controller, a SCSI disk controller, and a NIC. The optional monitor 107 may be implemented as part of an optional user interface.

Figure 10:
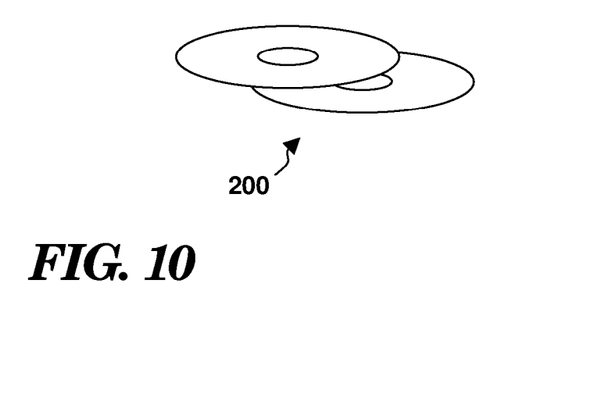
FIG. 10 is a diagrammatic representation of exemplary storage media that may be used in a computer program product implementation of software and/or firmware logic of the data processing system of FIG. 2 and the memory mapping system of FIG. 3.

Relative to a computer program product having a machine-readable media and programming logic, exemplary data storage media for storing the programming logic are shown by reference numeral 200 in FIG. 10. The media 200 are shown as being portable optical storage disks of the type that are conventionally used for commercial software sales, such as compact disk-read only memory (CD-ROM) disks, compact disk-read/write (CD-R/W) disks, and digital versatile disks (DVDs). Such media can store the logic of the memory mapping system 12 of FIG. 3 and the data required to establish the various tables, structures and other entities shown in FIG. 3, either alone or in conjunction with another software product that incorporates the required functionality. The foregoing logic and data could also be provided by portable magnetic media (such as floppy disks, flash memory sticks, etc.), or magnetic media combined with drive systems (e.g. disk drives), or media incorporated in data processing platforms, such as random access memory (RAM), read-only memory (ROM) or other semiconductor or solid state memory. More broadly, the media could comprise any electronic, magnetic, optical, electromagnetic, infrared, semiconductor system or apparatus or device, transmission or propagation signal or medium (such as a network), or other entity that can contain, store, communicate, propagate or transport the programming logic for use by or in connection with a data processing system, computer or other instruction execution system, apparatus or device. It will also be appreciated that the invention may be embodied in a combination of hardware logic and software elements, and that the software elements may include but are not limited to firmware, resident software, microcode, etc.

While various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A method for managing memory allocation among plural virtual application environments supported by a common operating system, comprising:
    establishing a mapping between a virtual application environment (or processes therein) and a mapping proxy that is reachable via a reverse mapping pathway adapted to facilitate identification of virtual addresses associated with a memory page frame;
    identifying said virtual application environment (or processes therein) as an allocation recipient of said memory page frame by traversing said reversing mapping pathway to said mapping proxy; and
    reclaiming said memory page frame for allocation to another virtual application environment by invalidating data therein or transferring said data to a storage resource based upon memory usage by said identified virtual application environment.

2. A method in accordance with claim 1, wherein said mapping proxy comprises a memory management entity that contains information for a process address space.

3. A method in accordance with claim 1, wherein said mapping proxy comprises a single mapping to said virtual application environment.

4. A method in accordance with claim 3, wherein said single mapping comprises a link between said mapping proxy and a resource accounting entity associated with said virtual application environment.

5. A method in accordance with claim 1, wherein said mapping proxy comprises plural mappings to individual processes in said virtual application environment.

6. A method in accordance with claim 1, wherein said reclaiming is conditioned upon said identified virtual application environment exceeding a memory resource limit or being allocated less than a memory resource minimum guarantee.

7. A system for managing memory allocation among plural virtual application environments supported by a common operating system, comprising: logic implementing hardware;
    a memory;
    a mapping proxy in said memory comprising a mapping to a virtual application environment (or to processes therein);
    said mapping proxy being reachable via a reverse mapping pathway adapted to facilitate identification of virtual addresses associated with said memory page frame;
    identification logic implemented by said logic implementing hardware and adapted to identify said virtual application environment (or processes therein) as an allocation recipient of said memory page frame by traversing said reversing mapping pathway to said mapping proxy; and
    reclamation logic implemented by said logic implementing hardware and adapted to reclaim said memory page frame for allocation to another virtual application environment by invalidating data therein or transferring said data to a storage resource based upon memory usage by said identified virtual application environment.

8. A system in accordance with claim 7, wherein said mapping proxy comprises a memory management entity that contains information for a process address space.

9. A system in accordance with claim 7, wherein said mapping proxy comprises a single mapping to said virtual application environment.

10. A system in accordance with claim 9, wherein said single mapping comprises a link between said mapping proxy and a resource accounting entity in said memory associated with said virtual application environment.

11. A system in accordance with claim 7, wherein said mapping proxy comprises plural mappings to individual processes in said virtual application environment.

12. A system in accordance with claim 7, wherein said reclamation logic is adapted to condition said memory page frame reclamation upon said identified virtual application environment exceeding a memory resource limit or being allocated less than a memory resource minimum guarantee.

13. A computer program product, comprising:
    one or more computer useable media;
    means associated with said computer useable media for programming a data processing platform to manage memory allocation among plural virtual application environments supported by a common operating system, as by:
    establishing a mapping between a virtual application environment (or processes therein) and a mapping proxy that is reachable via a reverse mapping pathway adapted to facilitate identification of virtual addresses associated with a memory page frame;
    identifying said virtual application environment (or processes therein) as an allocation recipient of said memory page frame by traversing said reversing mapping pathway from said page frame control structure to said mapping proxy; and
    reclaiming said memory page frame for allocation to another virtual application environment by invalidating data therein or transferring said data to a storage resource based upon memory usage by said identified virtual application environment.

14. A computer program product in accordance with claim 13, wherein said mapping proxy comprises a memory management entity that contains information for a process address space.

15. A computer program product in accordance with claim 13, wherein said mapping proxy comprises a single mapping to said virtual application environment.

16. A computer program product in accordance with claim 15, wherein said single mapping comprises a link between said mapping proxy and a resource accounting entity associated with said virtual application environment.

17. A computer program product in accordance with claim 13, wherein said mapping proxy comprises plural mappings to individual processes in said virtual application environment.

18. A computer program product in accordance with claim 13, wherein said reclaiming is conditioned upon said identified virtual application environment exceeding a memory resource limit or being allocated less than a memory resource minimum guarantee.

19. A computer program product, comprising:

one or more computer useable media;

means associated with said computer useable media for programming a data processing platform to manage memory allocation among plural virtual application environments supported by a common operating system, as by:

establishing a mapping between a virtual application environment (or processes therein) and a memory management entity that contains information for a process address space of a process in said virtual application environment;

said memory management entity being reachable from a page frame control structure via a reverse mapping pathway adapted to facilitate identification of virtual addresses associated with a memory page frame represented by said page frame control structure;

said reverse mapping pathway including one or more virtual memory area entities or anonymous memory entities that are linked to said memory management entity;

identifying said virtual application environment (or processes therein) as an allocation recipient of said memory page frame by traversing said reversing mapping pathway from said page frame control structure to said memory management entity; and reclaiming said memory page frame for allocation to another virtual application environment by invalidating data therein or transferring said data to a storage resource based upon memory usage by said identified virtual application environment.

20. A computer program product in accordance with claim 19, wherein said memory management entity comprises one or both of a single mapping to said virtual application environment or plural mappings to individual processes in said virtual application environment.

* * * * *